(12) United States Patent
Vicharelli et al.

(10) Patent No.: US 8,989,999 B2
(45) Date of Patent: Mar. 24, 2015

(54) VEHICLE RANGE ANALYSIS USING DRIVING ENVIRONMENT INFORMATION WITH OPTIONAL CONTINUOUS AVERAGING

(71) Applicant: Equilateral Technologies, Inc., Lexington, MA (US)

(72) Inventors: Pablo A. Vicharelli, Carlisle, MA (US); Donna Fagen, Carlisle, MA (US)

(73) Assignee: Equilateral Technologies, Inc., Lexington, MA (US)

( * ) Notice: Subject to any disclaimer, the term of this patent is extended or adjusted under 35 U.S.C. 154(b) by 0 days.

(21) Appl. No.: 13/796,202

(22) Filed: Mar. 12, 2013

(65) Prior Publication Data

US 2014/0107913 A1    Apr. 17, 2014

Related U.S. Application Data

(63) Continuation-in-part of application No. 13/650,325, filed on Oct. 12, 2012.

(60) Provisional application No. 61/713,075, filed on Oct. 12, 2012.

(51) Int. Cl.
  *B60W 40/06*    (2012.01)
  *B60W 40/10*    (2012.01)
  *G01C 21/34*    (2006.01)

(52) U.S. Cl.
  CPC ............... *B60W 40/06* (2013.01); *B60W 40/10* (2013.01); *G01C 21/3469* (2013.01)

USPC ............................................ 701/123; 701/423

(58) Field of Classification Search
  CPC ... B60W 40/06; B60W 40/10; G01C 21/3469
  USPC .................................................. 701/423, 123
  See application file for complete search history.

(56) References Cited

U.S. PATENT DOCUMENTS

| | | | |
|---|---|---|---|
| 5,189,621 A * | 2/1993 | Onari et al. | 701/102 |
| 5,778,326 A | 7/1998 | Moroto et al. | |
| 5,790,976 A | 8/1998 | Boll et al. | |
| 5,913,917 A | 6/1999 | Murphy | |
| 6,625,539 B1 | 9/2003 | Kittell et al. | |
| 7,532,974 B2 | 5/2009 | Sato et al. | |
| 7,751,969 B2 | 7/2010 | Jung et al. | |
| 7,778,769 B2 | 8/2010 | Boss et al. | |
| 8,290,701 B2 * | 10/2012 | Mason et al. | 701/422 |
| 8,538,694 B2 * | 9/2013 | Conway | 701/533 |
| 8,670,885 B2 * | 3/2014 | Gilman et al. | 701/22 |
| 2001/0000212 A1 | 4/2001 | Reipur et al. | |
| 2004/0230376 A1 | 11/2004 | Ichikawa et al. | |
| 2007/0176762 A1 | 8/2007 | Aoyagi et al. | |
| 2009/0055094 A1 | 2/2009 | Suzuki | |
| 2009/0114463 A1 | 5/2009 | DeVault | |
| 2009/0243555 A1 | 10/2009 | Tominaga | |
| 2010/0049389 A1 | 2/2010 | Ando | |
| 2010/0049397 A1 * | 2/2010 | Liu et al. | 701/33 |
| 2010/0138142 A1 | 6/2010 | Pease | |
| 2012/0016576 A1 * | 1/2012 | Huang et al. | 701/200 |

* cited by examiner

*Primary Examiner* — Calvin Cheung
*Assistant Examiner* — Allen E Quillen
(74) *Attorney, Agent, or Firm* — Cesari and McKenna, LLP

(57) ABSTRACT

Determining remaining vehicle range by adjusting measured estimates on the fly accounting for road effects, the state of vehicle accessories, and other conditions.

8 Claims, 19 Drawing Sheets

| Driving Schedule Attributes | Test Schedule | | | | |
| --- | --- | --- | --- | --- | --- |
| | City | Highway | High Speed | AC | Cold Temp |
| Trip Type | Low speeds in stop-and-go urban traffic | Free-flow traffic at highway speeds | Higher speeds; harder acceleration & braking | AC use under hot ambient conditions | City test w/ colder outside temperature |
| Top Speed | 56 mph | 60 mph | 80 mph | 54.8 mph | 56 mph |
| Average Speed | 21.2 mph | 48.3 mph | 48.4 mph | 21.2 mph | 21.2 mph |
| Max. Acceleration | 3.3 mph/sec | 3.2 mph/sec | 8.46 mph/sec | 5.1 mph/sec | 3.3 mph/sec |
| Simulated Distance | 11 mi. | 10.3 mi. | 8 mi. | 3.6 mi. | 11 mi. |
| Time | 31.2 min. | 12.75 min. | 9.9 min. | 9.9 min. | 31.2 min. |
| Stops | 23 | None | 4 | 5 | 23 |
| Idling time | 18% of time | None | 7% of time | 19% of time | 18% of time |
| Engine Startup* | Cold | Warm | Warm | Warm | Cold |
| Lab temperature | 68–86°F | | | 95°F | 20°F |
| Vehicle air conditioning | Off | Off | Off | On | Off |

FIG. 1

VEHICLE RANGE ANALYSIS USING DRIVING ENVIRONMENT INFORMATION WITH OPTIONAL CONTINUOUS AVERAGING

CROSS-REFERENCE TO RELATED APPLICATIONS

This application claims the benefit of U.S. Provisional Patent Application Ser. No. 61/713,075 which was filed on Oct. 12, 2012, by Pablo A. Vicharelli et al. for "VEHICLE RANGE ANALYSIS USING ENVIRONMENT INFORMATION AND/OR CONTINUOUS AVERAGING"; and is a Continuation-in-part of U.S. patent application Ser. No. 13/650,325, which was filed on Oct. 12, 2012, by Pablo A. Vicharelli et al. for a METHOD AND SYSTEM FOR VEHICLE RANGE ANALYSIS; both of which are hereby incorporated by reference.

BACKGROUND

1. Technical Field

This application relates to a method for estimating a vehicle's range or distance it will travel before it runs out of fuel and more specifically to using a combination of measured data and calculations to extend the applicability of such analysis to range predictions for a plurality of driving environments not considered in the measurements.

2. Background

The range of a vehicle is usually specified by the manufacturer assuming a set of conditions such as flat terrain, driving environment (city, highway) and a specified weight. The actual range obtained by a driver will depend on speed, terrain, cargo, climate control, driving style and other factors. This range variation applies to both electric and internal combustion vehicles. However, drivers of gasoline vehicles have an extensive network of gas stations available to them while drivers of electric vehicles fear that they might be stranded if they run out of charge with no charging station nearby. This uncertainty in the range leads to what is called "range anxiety." To alleviate this anxiety, automakers provide built-in navigation systems that provide maps with the locations and directions to the closest charging stations, as well as a circle map overlay that indicates graphically the range of the car, i.e., the range is turned into the radius of a circle. All electric vehicles provide some sort of graphical bar display that indicates the amount of charge remaining in the battery and/or the range, a single number.

There are two main approaches for the determination of the range of a vehicle: (a) measurements, and (b) detailed mathematical modeling. The range of a vehicle is typically measured in a laboratory with the help of a dynamometer that simulates the driving environment. The measurement includes rolling resistance under flat terrain conditions for several simulated driving schedules designed to simulate, e.g., city and highway driving. Three additional tests are available to account for higher speeds, air conditioning use, and colder temperatures. FIG. 1 provides details for all five United States' Environment Protection Agency (EPA) test schedules, which apply to vehicles with internal combustion engines. The EPA is currently working to establish somewhat different testing criteria for electric vehicles and plug-in hybrids.

This kind of measurement usually includes the effect of vehicle weight and aerodynamic drag by adjusting the energy required to move the dynamometer rollers. Range is reported as a distance, e.g., 100 mi, for each driving environment, ambient temperature, and which accessories are turned on for a tank full of fuel or a fully charged battery.

Some current navigation systems display the measured range as a circular contour, implying that locations inside the contour can be reached by the vehicle. The idea there is that as the fuel level or battery charge decreases, the circle radius will decrease accordingly. A sample display is shown in FIG. 2. Even though this display is supposed to take into account the remaining battery charge, current location, and driving conditions, it is overly optimistic. The reason is that this range estimate reflects EPA-type or vehicle manufacturer's measurements, which likely do not include terrain variations, the effects of driving on actual roads, changes in the driving surface, or the actual driving speeds.

SUMMARY

Of these effects, perhaps the most important is the constraint that vehicles are usually required to follow roads and obey traffic regulations, e.g., one-way signs, as opposed to the straight line assumed by the prior art. Therefore, a need exists for more accurately computing a vehicle's range for more realistic driving environments. Furthermore, a more accurate map display of the range for a single trip or for the construction of a maximum range contour, i.e., trips in all possible directions, is also needed. Our initial motivation is the application to electric vehicles, but naturally, the analysis applies as well to vehicles based on internal combustion engines, hydrogen fuel cells, etc. So we will use the terms fuel, electric charge, or just charge, interchangeably.

It is an advantage of our approach that range analysis starts out with a measured range and subsequently adjusts it to account for factors not included in the original measurements. Thus, this approach is based on modeling done relative to the conditions used in quantifying measured vehicle range by calculating contributions that either penalize or enhance the measured range. For concreteness, we discuss EPA measurements here, but the range could come from any measurement, even from real time measurements from within the vehicle itself. In addition, the reference data could be produced by some other detailed mathematical model for range and the methods described here could be used to extend its applicability.

The model is made more realistic by simulating driving by following actual roads, instead of the straight-line "as the crow flies" driving path implied by the EPA measurements and implemented in the sample range display of FIG. 2. In addition, we optionally include the effects due to changing driving surface conditions, which in turn affect the rolling resistance. Aerodynamic drag effects are also incorporated in the modeling when average speeds are available for various road types. Finally, terrain effects are also taken into account; going uphill/downhill can decrease/increase the range.

The modeling is preferably done within the framework of a computerized system that provides the necessary road information database and routing capabilities for driving from one location to another. It could thus naturally be implemented in existing vehicle navigation systems hardware and software, in one embodiment.

In a preferred arrangement, the range estimates that depend on road conditions are then further adjusted by taking into account the state of accessories that may further affect range, such as air conditioning systems and the like.

These estimates of the affects on the maximum range due to the road conditions and is accessory state can then further be averaged on the fly continuously. The result is improved estimate of the expected maximum range.

BRIEF DESCRIPTION OF THE DRAWINGS

The foregoing and other objects, features and advantages, which are not meant to be limiting, will be apparent from the following more particular description of preferred embodiments, as illustrated in the accompanying drawings in which like reference characters refer to the same parts throughout the different views.

FIG. 1 illustrates the common driving schedules currently used to measure fuel efficiency and range;

FIG. 16 is a graph of the continuously-averaged maximum range for a trip through city and highway environments with the air conditioning turned off and on;

DETAILED DESCRIPTION OF A PREFERRED EMBODIMENT

The following detailed description is merely exemplary in nature and is not intended to limit the invention as claimed or its application and uses. For most driving environments perhaps the largest impact on vehicle range comes from the fact that vehicles must (usually) follow the roads. Our approach therefore begins with road effects.

Figure 2:
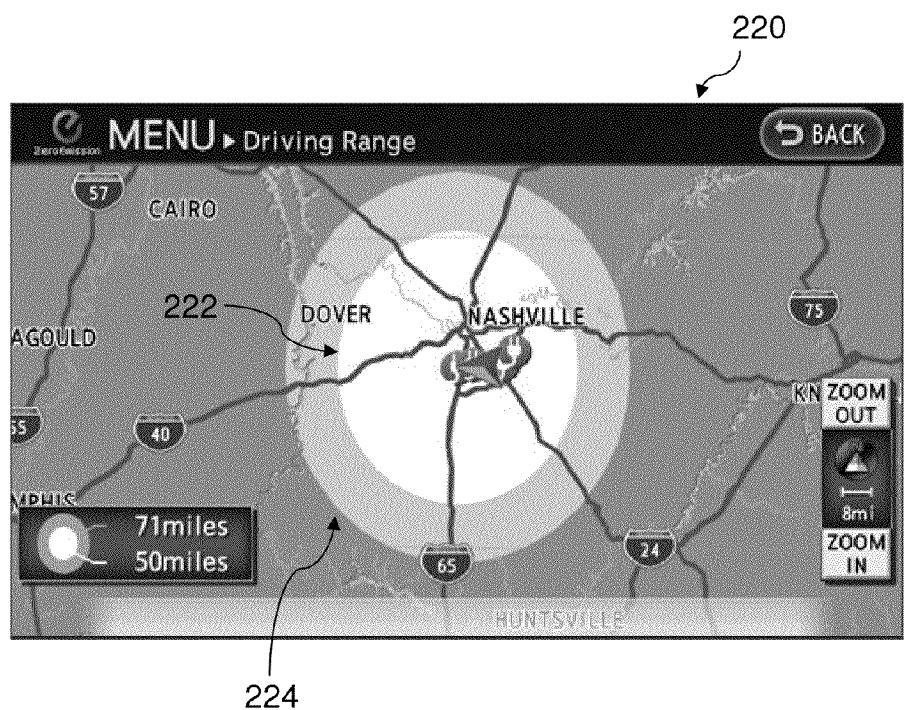
FIG. 2 is an illustration showing a prior art display of vehicle range.

Consider a vehicle whose range $D_{max}$ that has been determined from measurements in a flat terrain environment, and only one type of road surface such as described in the EPA schedules of FIG. 1. In terms of driving range, this value is usually all that is reported by the vehicle manufacturer. One aspect here generalizes this approach and provides a more realistic estimate of range. Starting from the current vehicle location we obtain a contour that defines how far we can drive before we run out of fuel or charge (more generally, "energy"). This would give us a graphical (or geographical) sense of the range in two dimensions, i.e., on a map. If we are driving along flat terrain radially outward, the contour would be a circle with radius $D_{max}$. Typical contours might look like those in FIG. 2. Such a simple contour 222 or 224, which is what is currently provided by some manufacturers of electric vehicles, assumes that we drive only along the radial direction, i.e., constant azimuth angle away from the starting location. But this scenario would only present the exact result for cases where one can drive radially outward without any regard for roads, i.e., to cases where there are no roads and the vehicle can traverse them, as in a desert. It is a very simplistic approach to getting from point A to point B by choosing the shortest path. This path is a great circle arc, which approaches a straight line for short distances.

Figure 3:
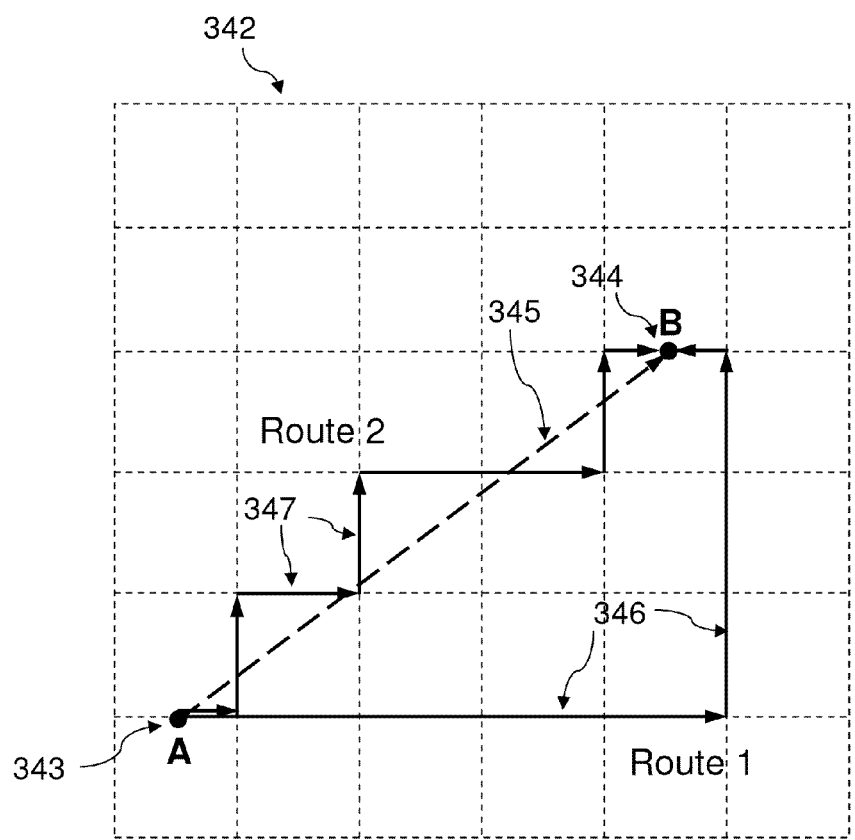
FIG. 3 is a schematic representation some possible routes to get from location A to location B in an idealized city where all the blocks are the same size.

In practice, vehicles usually must follow existing roads, and the moment we deviate from the straight line A-B path we end up driving longer. This extra driving could, in general, lead to appreciably longer driving distances, which might mean that we could run out of fuel or charge before we get to our destination. This is illustrated in FIG. 3 where we show a schematic of some ideal city 342 where the blocks are all the same size. Here we see that the optimal, i.e., straight-line, route 345 that goes from A to B has a length of 5 in block units. However, if the existing roads, including one-way restrictions, etc., force us to go due east, then north, and finally west, we would have driven 8 blocks, as indicated by 346 (Route 1). This means that the more realistic route is 60% longer, implying that it would use 60% more fuel/charge. This represents a huge fuel efficiency penalty just by following the roads. Naturally, if we could stay as close as possible to the A-B path we would expect a smaller penalty. To do that we would have to zig-zag about the straight line route. An example of a zig-zag route 347 is also given in FIG. 3, where we see that this route (Route 2) would travel for 7 blocks. The penalty in this case is 40%, which is smaller than in the previous example, but still quite significant. In fact, even in the very simple case where we wish to travel from a corner in a block to the diagonally opposite corner, the straight-line distance is sqrt(2)=1.41 blocks, while the realistic going around the block distance is 2 blocks. In this case the penalty is about 42%.

So, the penalty could range from negligible, for paths that mostly follow a single road, i.e., horizontally or vertically in FIG. 3, to greater than 40%, for short (~10-20 mi), roughly diagonal paths. An important point to make here is that since the vehicle-driving-distance penalties vary over such wide range depending on orientation, the circular contour currently used is not very meaningful. In fact, if vehicles follow roads most of the time, all these possibilities will be encountered when defining a contour, i.e., as we imagine drawing radials over 360 degrees. As we might expect, the contour would exhibit significant deviations from a circular shape.

Our approach in one embodiment quantifies the effects of needing to follow the roads. We start with a single A to B path such as the one illustrated in FIG. 4. The endpoints could be defined by the coordinates (latitude and longitude) of the A and B points, or by their street addresses. Point 447 is arbitrary and the end point 448 represents a location at a distance equal to the maximum range of a vehicle, given some amount of fuel in the tank/battery. The distance along a straight line path 453 connecting points A and B, $D_{max}$, would represent the best that we can do in terms of shortest distance and it will be our reference value. Then, we try to come up with a driving route that most closely approximates it, given the details of the local roads and one-way restrictions. This route could be obtained by algorithms such as those used by vehicle navigation systems or by Google maps. Such a route 449, 452, and 450, could be obtained based on various criteria (shortest distance, most use of highways, etc.); we will base it on the shortest distance for now. The route will be provided as an array of waypoints 516 such as those schematically illustrated in FIG. 5. The k-th element of this array is represented by $p_k$. The total distance will then be calculated by adding the individual waypoint to waypoint distances, $$D_T = \sum_{k=1}^{N-1} d_k \quad (1)$$

where $D_T$ is the total route distance, $d_k$ is the distance 518 between the waypoints with is indices k+1 and k, $$d_k = p_{k+1} - p_k, \quad (2)$$

and N is the number of waypoints in the route, which means we have N−1 road distances or segments. In general, for a given pair of A and B locations the distance $D_T$ will be larger than the distance $D_{max}$ if we follow the roads. We will be interested in a partial summation given by $$D_{max} = \sum_{k=1}^{n} d_k, n \leq (N-1). \quad (3)$$

In other words, as we follow the roads when going from A to B, we will reach the distance $D_{max}$, the point where we would run out of fuel/charge, and therefore not be able to reach B. So, a particular drive route is analyzed by adding the terms in the summation above, until we reach $D_{max}$. The corresponding index n will indicate which waypoint we were able to reach. In practice, it is unlikely that the waypoint will hit the $D_{max}$ value exactly. Most of the time we will overshoot when using the above summation, and in this case we will need to interpolate to find the actual location.

Figure 4:
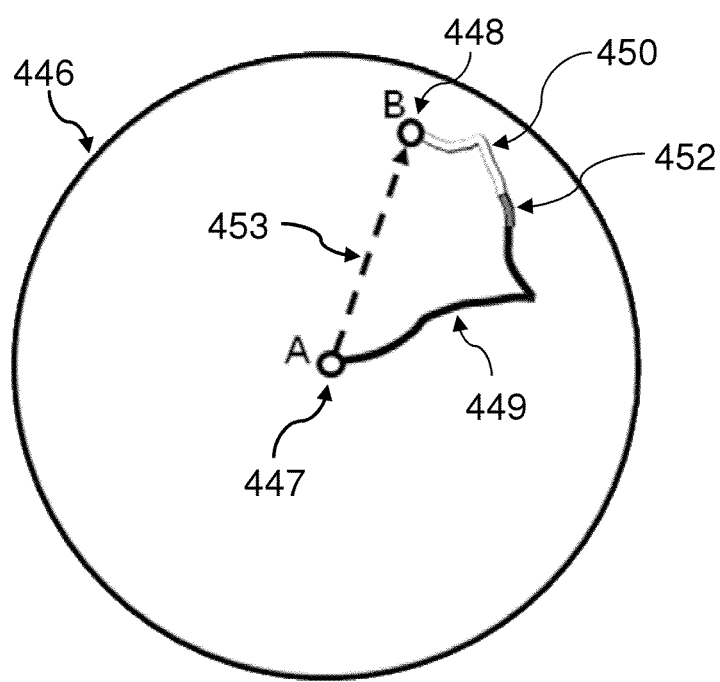
FIG. 4 is a schematic representation of a single-route range analysis using roads.

The straight-line A to B path is shown as a dashed line 453 in FIG. 4. The circle 446 represents the "no-roads" contour, centered at A with a radius $D_{max}$. Even though point B 448 is inside the circular contour, the existing roads force the driver to follow a route that ends up exhausting the fuel/charge before reaching the destination point B. The example route has been obtained from Google maps using actual streets in a suburb of Boston. The route is displayed as three segments—black 449, grey 452, and white 450. The color coding is as follows: We start out with a full tank of fuel (or a fully charged battery) and we analyze the route distance to find the point where we run out of fuel. Then the segment 449 from A to this point is displayed as black. The rest of the route, which in principle is not accessible because we have no more fuel, is displayed as a white segment. Since fuel/charge gauges are not exact but will have some error, assume, for example, +/−δ%, the black to white transition will not occur at a single point, but rather, it will be spread over some distance, +/−δ% of the length of the black segment for this example. This uncertainty is illustrated by the grey segment 452 in the route of FIG. 4. The route differs so much from the dashed line that it runs out of fuel somewhere in the grey segment. Again, this uses actual roads. The white segment 450 represents unreachable locations.

Figure 6:
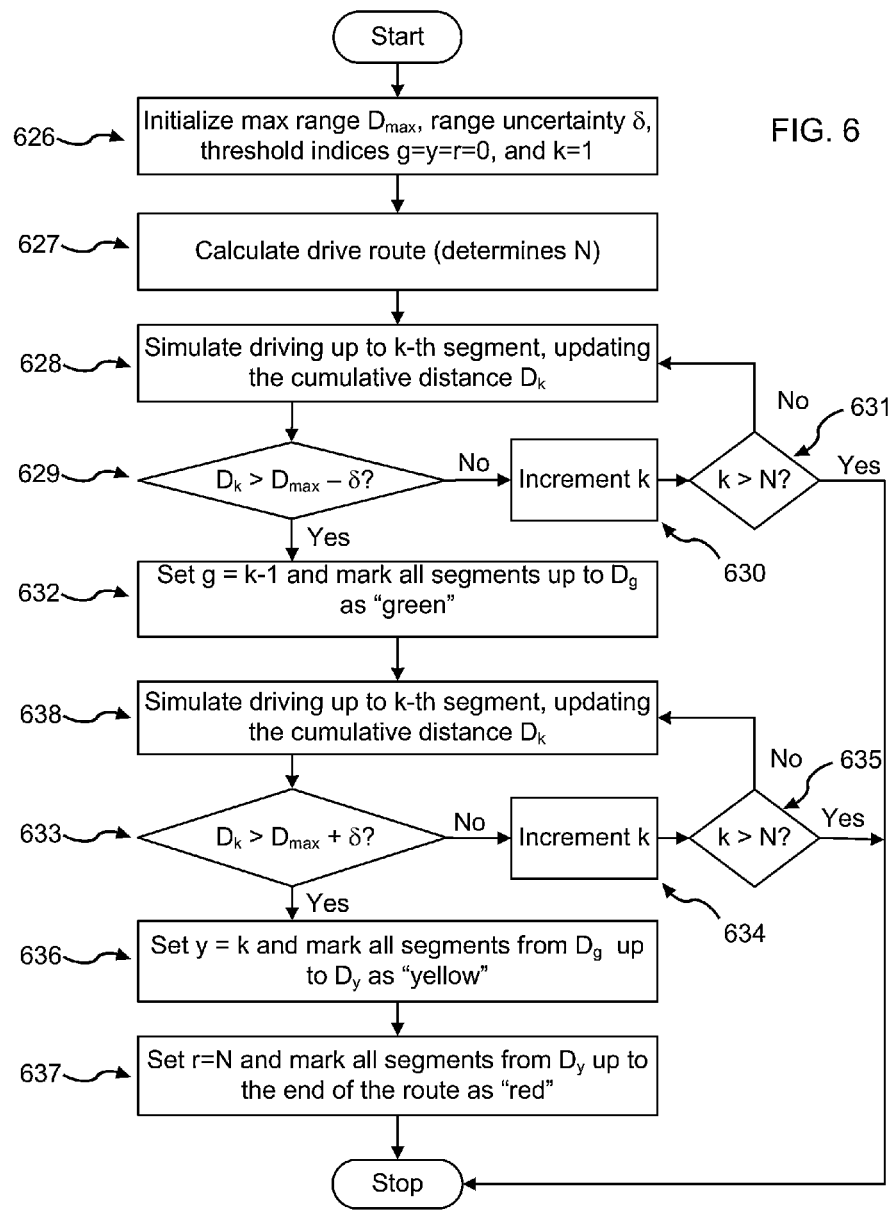
FIG. 6 is a flowchart of the process for analyzing a single drive route using road information.
Figure 7:
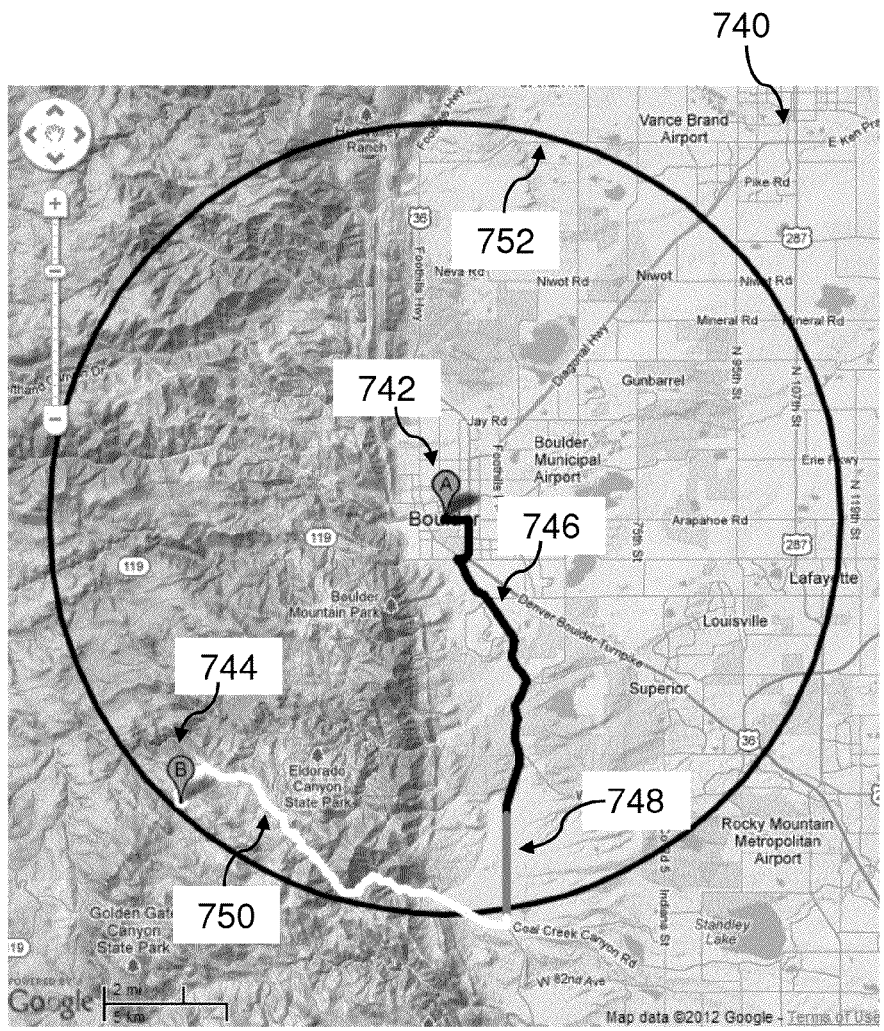
FIG. 7 is map display with sample range analysis results for a single route using road information.

Naturally, the color scheme is totally arbitrary. In our preferred embodiment we select green for segments that are reachable, red for segments that are unreachable, and yellow for uncertain locations between the green and red segments. The steps involved in the calculation of this type of color-coded analysis of the vehicle range are summarized in the flowchart of FIG. 6 and a sample route calculated with actual map data for the area 740 around Boulder, Colo., is shown in FIG. 7. The simulation starts at a downtown location 742, and ends at a location in the nearby foothills 744. We assume there is just enough fuel to reach the destination location, indicated by the circular contour 752 and that the fuel/charge indicator has a 10% accuracy. A calculation 627 of the shortest route results in a route constructed from segments 746, 748, and 750. The present method predicts that the vehicle would only reach locations within the black segment 746 and perhaps to some locations within the grey segment 748, while the prior state of the art erroneously predicts that it would reach its destination 744 because this location is just inside the circle.

Figure 8:
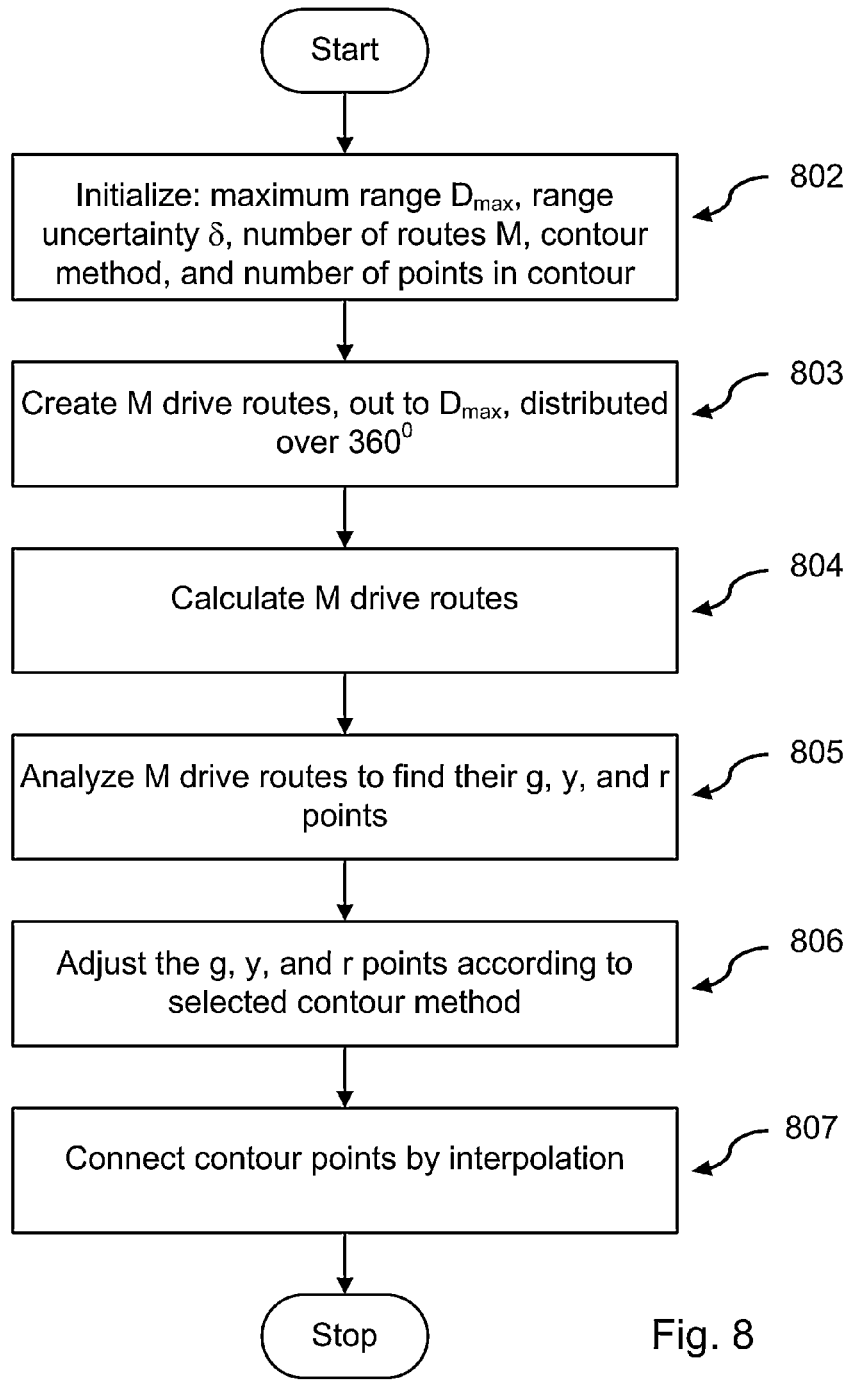
FIG. 8 is a flowchart of the process for calculating points for a color-coded range contour.
Figure 9:
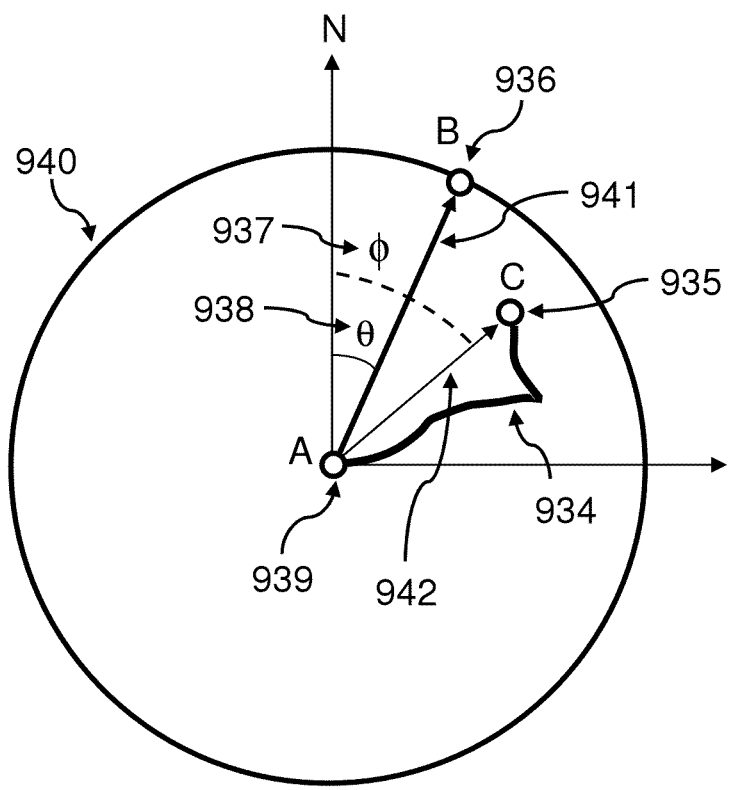
FIG. 9 is a schematic representation of the variables involved in calculating a range contour.
Figure 10:
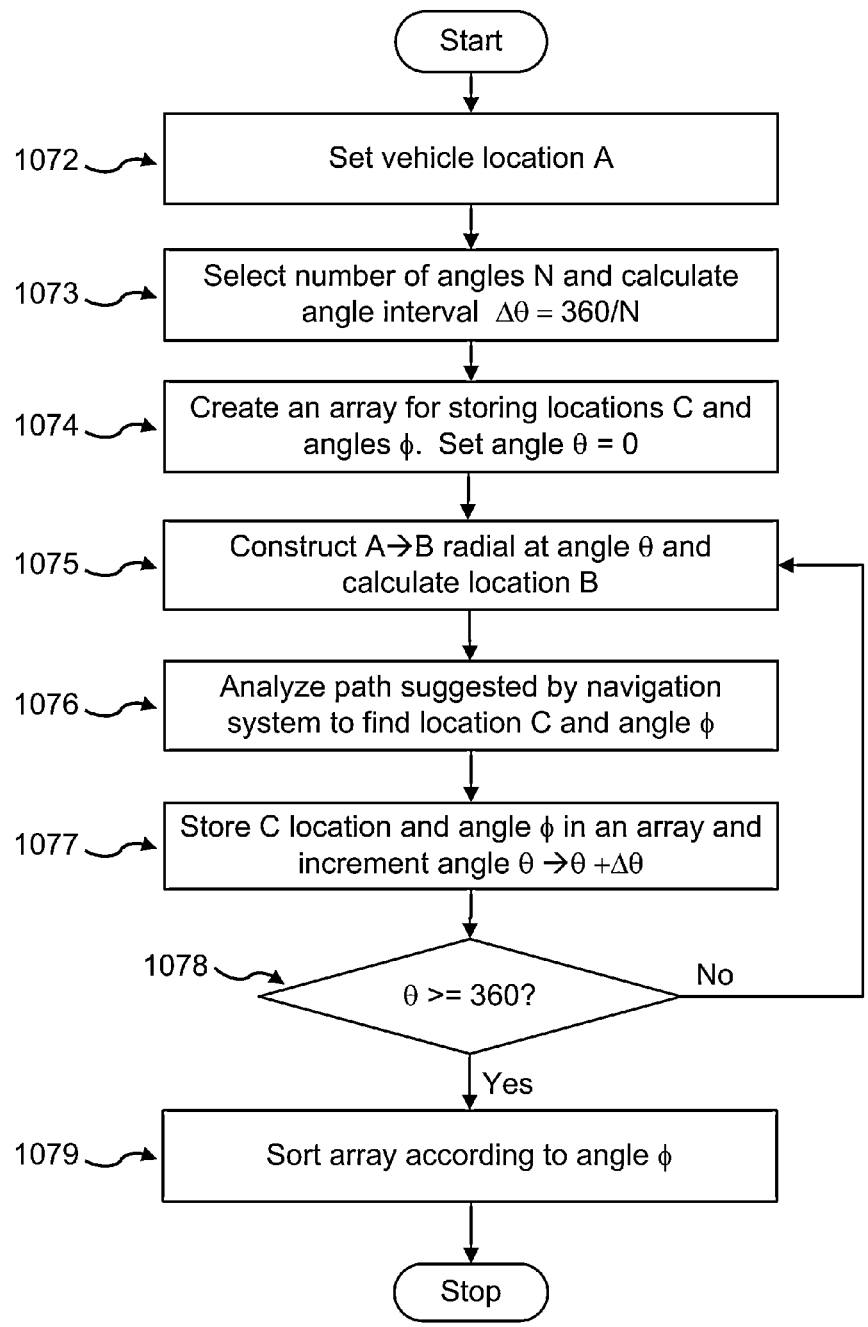
FIG. 10 is a flowchart of the process for calculating a single point of a range contour.
Figure 11:
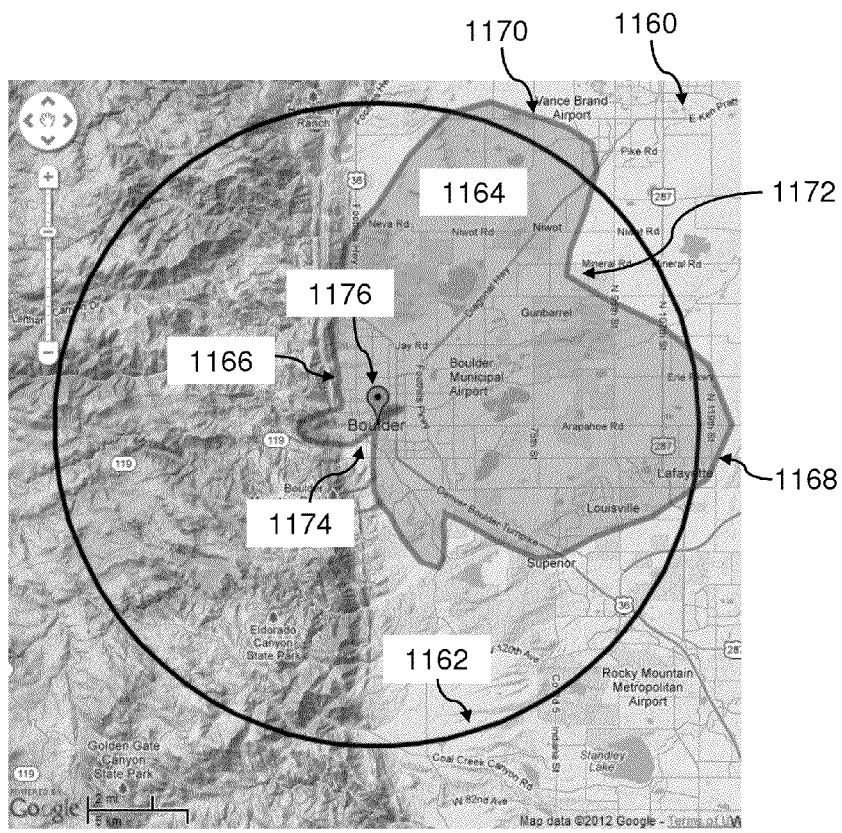
FIG. 11 is a map display with a sample range contour.

A more realistic contour that takes into account the roads involved in the route can be calculated by selecting multiple radials. Preferably the radials would be evenly spaced around 360 degrees, but that is not a requirement and any angular separation could be used. The flowchart in FIG. 8 illustrates the steps of this process. The radials are constructed so that the A to B straight-line distance equals the given $D_{max}$ that corresponds to the specified range of the vehicle under consideration. In effect, the measured range defines a circular reference contour. Now we select an azimuth angle for the A to B radial. If A and B happened to be connected by a road, then point B would represent the contour point for this radial. However, when we invoke the routing module 804 to arrive at a route that follows the roads, it is more likely that we could, for example arrive at some point C in FIG. 9. This point 935 represents the closest we are able come to the destination B before we run out of fuel. Notice that the radial that goes from A to C could in general have a different angle 937 and radial distance 942 when compared with the original angle 938 and distance 941. So the AB radial 941 is replaced by the AC radial 942, and we proceed to the next radial. This process is repeated until the desired number of radials is calculated as illustrated in FIG. 10. An example of a typical contour obtained this way including the tractive effects discussed below is shown in FIG. 11. The deviation from the reference circle can be quite large, coverage is about 40% of the area of the circle.

In order to make the modeling more realistic we can also include tractive effects and we also use the measured range $D_{max}$ to estimate the available energy for the conditions corresponding to the EPA tests. Then, we equate this energy to the energy calculated by our model—this leaves our calculated range as an unknown parameter. Next, we use our model to simulate driving along the route until we run out of energy and we record the location where this happens. This is as far as the vehicle will be able to go without additional charging. Finally, we report this location to the driver, either by specifying the lat-long, the corresponding address, or by color-coding the drive route on the navigation system display.

Modeling Tractive Effects

Figure 5:
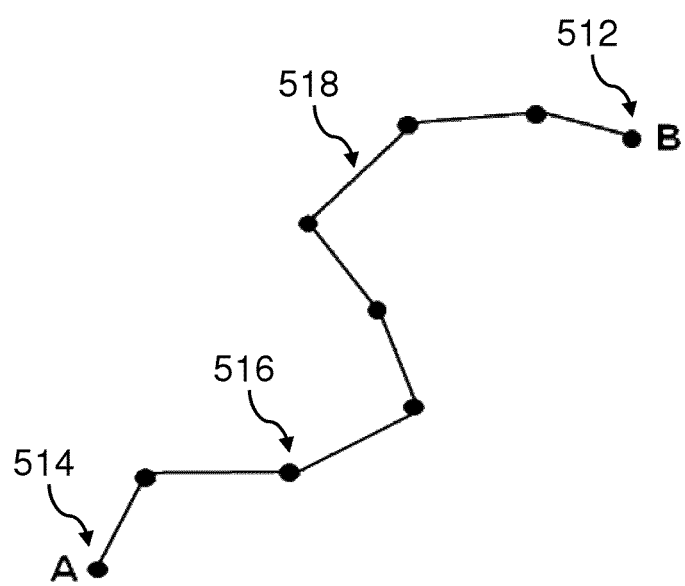
FIG. 5 is a schematic representation of an arbitrary driving route from point A to point B.

Consider the movement of a vehicle from point A to point B along path S as schematically illustrated in FIG. 5. The work done is given by $$W_{A \to B} = \int_A^B F_T ds \quad (4)$$

where $F_T$ is the total tractive force or road load given by $$F_T = F_R + F_H + F_A + G. \quad (5)$$

Here $F_R$ is the rolling resistance force, $F_H$ is the hill climbing force, $F_A$ is the aerodynamic drag, and G is a term that represents all other forces, e.g., braking, and driver-dependent effects such as acceleration/deceleration during stop-and-go driving. The U.S. Department of Energy (DOE) has published some estimates of braking losses for city, highway, and combined city/highway driving. We can use those estimates for the G term as representatives values for an average driving style.

Since our modeling is based on paths described by arrays of latitude-longitude points, we can use these points to construct straight-line segments that can be used to approximate the integral of Eq. (4). In addition, since the motion will be parallel to the segments we can write $$W_{A \to B} \cong \sum_{k=1}^{N-1} F_T(k) s_k, \quad (6)$$

where $F_T(k)$ is the force along the road segment, N is the number of waypoints, N−1 is the number of segments for the A to B route, and $s_k$ is the length of the k-th segment. With the help of the coordinates shown in FIG. 12, the forces associated with a segment can be written as $$F_R(k) = \mu_k mg\cos(\theta_k) \quad (7)$$

$$F_H(k) = mg\sin(\theta_k) \quad (8)$$

and $$F_A(k) = \frac{1}{2}\rho v_k^2 C_D A \quad (9)$$

Here $\mu_k$ is the coefficient of rolling resistance, m is the mass of the vehicle, g is the acceleration of gravity, $\theta_k$ is the road slope angle, $\rho$ is the air density, $v_k$ is the air velocity relative to the vehicle, $C_D$ is the drag coefficient, and A is the frontal area of the vehicle.

Since the measurements and the actual driving could also include cases where the accessories, e.g. the air conditioning or heater, are turned on or off, we would need to add an extra term $W_{acc}$ to account for this. This term is not a tractive term, but it is an energy loss, so it is convenient to incorporate it as part of the work done. For consistency, we break up this energy into a sum of contributions over all route segments. In other words, we assume that we can define an effective accessory energy density H(k) so that we write $$W_{acc} = \sum_{k=1}^{N} W_{acc}(k) = \sum_{k=1}^{N} H(k) s_k. \quad (10)$$

The energy density H(k) is represented as an array of values that correspond to the array of road segments. It could have some background value for road segments $s_k$ where the accessory is off and then go to some characteristic value of the accessory energy consumption for the segments where it is on. One could also have multiple steps if, for example, the heater/AC has multiple temperature settings.

Putting it all together we find that the work done in going from point A to B would be $$W_{model} = \sum_{k}^{N}[F_R(k) + F_H(k) + F_A(k) + G(k) + H(k)]s_k \quad (11)$$

$$= \sum_{k}^{N}\left[\mu_k mg\cos(\theta_k) + mg\sin(\theta_k) + \frac{1}{2}\rho v_k^2 C_D A + G(k) + H(k)\right]s_k$$

Now let's connect this model to the EPA measurements, whose main result is a reported maximum range $D_{max}$. All the other quantities are determined from the test schedule. A single rolling resistance coefficient, which we can call $\mu_{ave}$ is used, the angle $\theta_k$ goes to zero for flat terrain, $v_k$ is replaced by the corresponding average speed for city or highway driving, and G and H are also replaced by their averages. We get $$W_{meas} = \left[\mu_{ave} mg + \frac{1}{2}\rho v_{ave}^2 C_D A + G_{ave} + H_{ave}\right]D_{max}. \quad (12)$$

The equation for $W_{meas}$ gives us the energy spent to reach distance $D_{max}$, so it is reasonable to assume that the same energy is available for our modeling. Setting the last two equations equal to each other we get, $$W_{model} = W_{meas}, \quad (13)$$

or, $$\sum_{k}^{n \leq N}\left[\mu_k mg\cos(\theta_k) + mg\sin(\theta_k) + \frac{1}{2}\rho v_k^2 C_D A + G(k) + H(k)\right] \quad (14)$$

$$s_k = \left[\mu_{ave} mg + \frac{1}{2}\rho v_{ave}^2 C_D A + G_{ave} + H_{ave}\right]D_{max}$$

Figure 12:
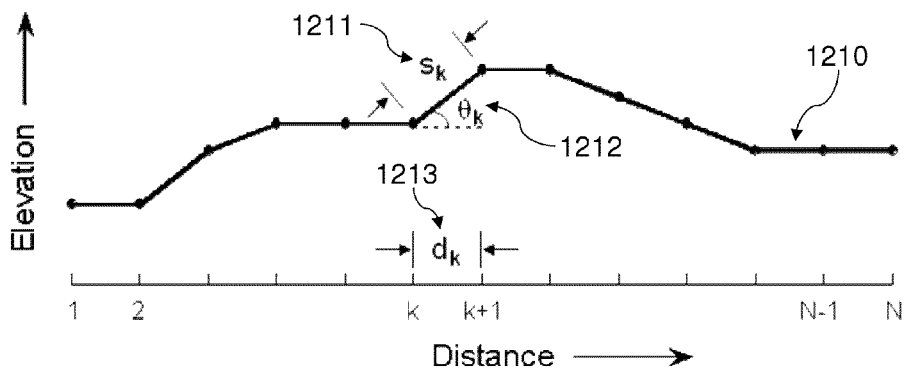
FIGS. 12(a) and 12(b) are a schematic display of the variables involved in calculating tractive effect contributions to the vehicle range calculation.
Figure 12:
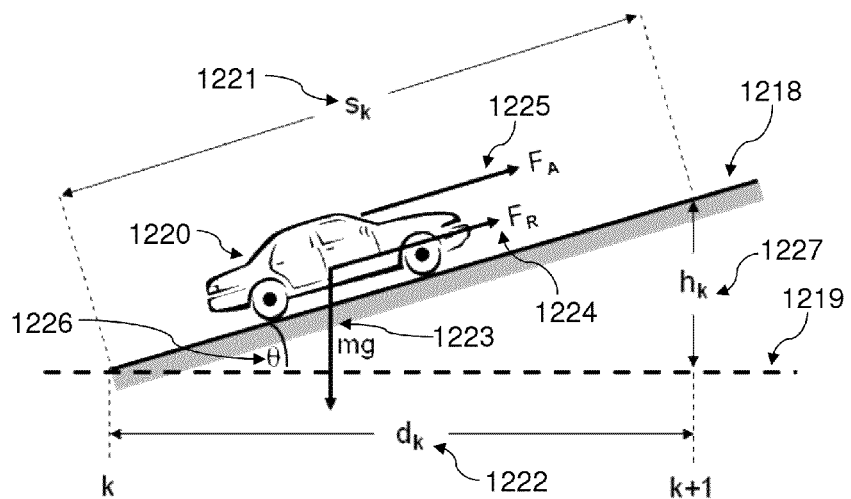

This relationship can be re-written in the more compact form $$\sum_{k}^{n \leq N} \alpha_k d_k = D_{max} \quad (15)$$

where $$d_k = s_k \cos(\theta_k) \quad (16)$$

is the projection 1222 of the k-th segment length 1221 on the ground, as shown in FIG. 12 and $$\alpha_k = \frac{1}{(1+\Gamma)(1+\Delta)}\left[\left(\frac{\mu_k}{\mu_{ave}}\right) + \left(\frac{\tan(\theta_k)}{\mu_{ave}}\right) + \Gamma\sec(\theta_k)\left(\frac{v_k}{v_{ave}}\right)^2 + \Delta(1+\Gamma)\sec(\theta_k)\left(\frac{G_k + H_k}{G_{ave} + H_{ave}}\right)\right] \quad (17)$$

acts as a coefficient that weighs the contributions for each road segment. This is our main result. Eq. (15) models the calculated range as a sum of weighted route segments. It is similar to Eq. (3), which was derived for the case that only includes the restriction that we must drive on the roads. Just as we did before, we can simulate driving along each segment and adding up the individual contributions until the summation matches the measured $D_{max}$. The upper summation limit in Eq. (15) has been modified to account for the fact that the vehicle being modeled might run out of fuel/charge before it reaches the last route segment. If the weight $\alpha_k$ is greater than one it acts as a penalty because we reach $D_{max}$ sooner and we might not reach point B. Conversely, if it is less than one or even negative, it enhances the calculated range. So our problem reduces to estimating the values of the $\alpha_k$ weights.

Eq. (15) could be expressed in terms of $s_k$, but we prefer $d_k$ since it is a projected distance that is usually reported by navigation systems. In other words, navigation systems usually do not account for terrain variations, and if we're working with one that does, we simply take that into account.

Vehicle Fuel Efficiency in Mixed Driving Environments

The EPA typically reports vehicle fuel efficiency data as miles per gallon (mpg) ratings for two types of driving environments, city and highway. It also reports a combined rating, which is a weighted average of the two. Letting E represent the mpg we can write $$E_{comb} = a_{city}E_{city} + a_{hwy}E_{hwy} \tag{18}$$

where the EPA weight $a_{city}$ and $a_{hwy}$ are set to 0.55 and 0.45, respectively.

This can be modified to account for the actual environment being driven or planned to be driven for a trip. Consider a drive route with N+1 waypoints. We construct an array of N road segments defined by one waypoint to the next. As we imagine driving along this route segment by segment, we record whether we're driving in the city or on a highway. Then we count the number of segments that lie in the city. This number, normalized to the total number of segments, yields the actual weight for city driving, $$a_{city}(N) = \frac{1}{N}\sum_{j=1}^{N} g_j^{city} \tag{19}$$

where $$g_j^{city} = \begin{cases} 1, & \text{if } j\text{-}th \text{ segment is in the city} \\ 0, & \text{otherwise} \end{cases} \tag{20}$$

The highway weight can evaluated using a similar summation, but since the weights should be normalized, it is more convenient to calculate it from $$a_{hwy} = 1 - a_{city} \tag{21}$$

This approach would give a much better estimate of the combined efficiency rating, at the expense of analyzing the route segment by segment. This type of treatment can be along an actual route generalized to the case of M environments and partial trips. Again, starting with an array of N road segments, when we simulate driving up to the k-th segment, we write $$a_m(k) = \frac{1}{k}\sum_{j=1}^{k} \delta_{e(j),m} \tag{22}$$

with $$\delta_{e(j),m} = \begin{cases} 1, & \text{if } e(j) = m \\ 0, & \text{otherwise} \end{cases} \tag{23}$$

Here e(j) is the environment ID for the j-th segment, with e(j)={1, 2, ..., M}, δ is a Kronecker delta, and $a_m(k)$ is the (city or highway) cumulative weight for the m-th environment for a trip that has gone to the k-th segment. Then, the combined fuel efficiency up to the k-th segment will be given by $$E_{comb}(k) = \sum_{m=1}^{M} a_m(k)E_m, \tag{24}$$

$$k \leq N$$

This is a quantity that can be computed/updated while the vehicle is moving if we have access to its location coordinates, perhaps from a GPS device, and to information about the environment at that location. The latter can be obtained from digital road maps, which contain a wealth of information about whether a particular road is a highway, a secondary road, etc. The fact that the EPA reports only two environments simplifies the calculation significantly. However, if at a later time we could have more environments measured and their fuel efficiencies reported, the road maps and the equations above would allow more accurate combined estimates. For areas where roads are available, but type information is sparse or nonexistent, one can add other sources, such as Land Use and Land Cover (LULC) maps provided by the U.S. Geological Survey and other international agencies to the road type analysis. These maps are quantized into raster pixel areas (e.g., 30×30 m pixels) that contain raster information that tells us if an area is an urban, suburban, rural, etc., environment. LULC maps are frequently used in computer programs that predict wireless signal propagation.

This method of calculating the weights can also be applied to the averaging of the vehicle range used the Range Analysis described above. We write $$D_{comb}(k) = \sum_{m=1}^{M} a_m(k)D_m, \tag{24}$$

$$k \leq N$$

where $a_m(k)$ is as defined above, $D_m$ is the maximum range associated with environment m, with m={city, highway, ...}, and $D_{comb}(k)$ is the combined maximum range evaluated up to segment k. In other words, it is a combined range that is updated dynamically as the vehicle travels.

To incorporate the dynamic variations to the combined range into our analysis we then replace $D_{max}$ with $D_{comb}(n)$ in Eq. (15) above. This substitution results in the following equation $$\sum_{k}^{n \leq N} \alpha_k d_k = D_{comb}(n). \tag{24}$$

where n is the maximum value of k in a progression of partial summations as n ranges from 1 to N. As outlined above, this equation is used to simulate driving along each segment $d_k$, adding up the individual segment contributions while monitoring the value of the summation for each value of n. We stop the simulation when the summation on the left-hand side matches the combined maximum range of the right-hand side.

Averaging Range Estimates on the Fly

While improved combined fuel efficiency ratings estimated according to the above equations could be useful in some applications, the averaging done for the max ranges can become important in improving the accuracy of the range analysis as the vehicle moves. This model, as explained above, simply uses a max range $D_{max}$ that could be city, highway, or combined (meaning 55/45). With this additional modeling, it could use a much better estimate of the combined range generated on the fly.

Figure 13:
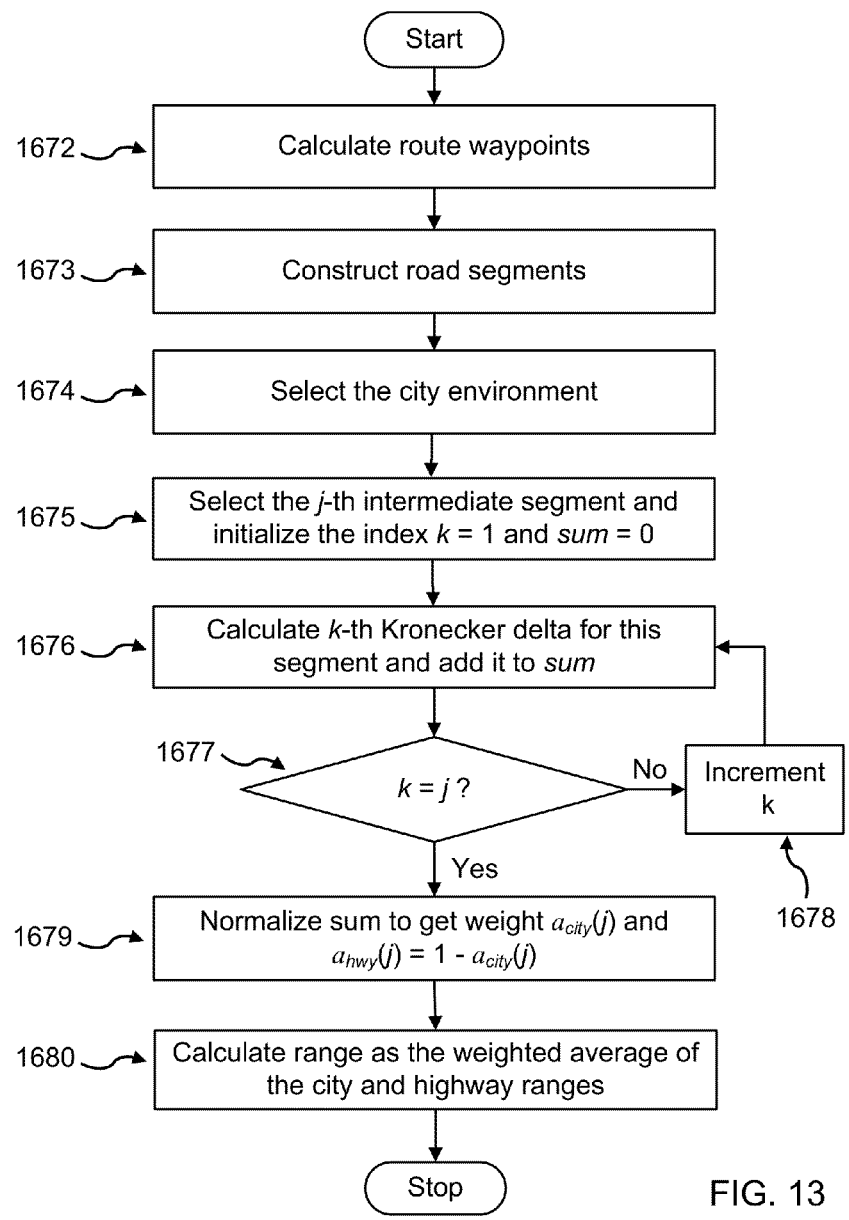
FIG. 13 is a flowchart of the process for the continuous averaging of the maximum range for multiple driving environments.

The steps involved in calculating this averaging on the fly are outlined in FIG. 13 for the case of two environments, city and highway. In a first step 1672, route waypoints are determined. These waypoints are then used to construct the road segments 1673 and from the segments determine the driving environment 1674. Subsequently, the normalized weights are calculated from the sum of steps 1676 to 1678. Finally, in step 1680 the range is calculated as the weighted average of the city and highway ranges.

An additional benefit of this type of continuous averaging is that it allows the analysis of a vehicle's range also taking into consideration the on/off state of accessories such as the AC or heater. For example, the following table summarizes some typical straight-line ranges for a typical electric passenger car, the Nissan Leaf:

| Environment | Max Range, AC On | Max Range, AC Off |
| --- | --- | --- |
| City | 47 mi | 105 mi |
| Highway | 70 mi | 138 mi |
| Combined (55/45) | 57 mi | 120 mi |

The numerical values shown in this table represent the $D_m$ terms in the equation above. As we can see, whether the AC is on or off has a large impact on the maximum range of this vehicle.

Figure 14:
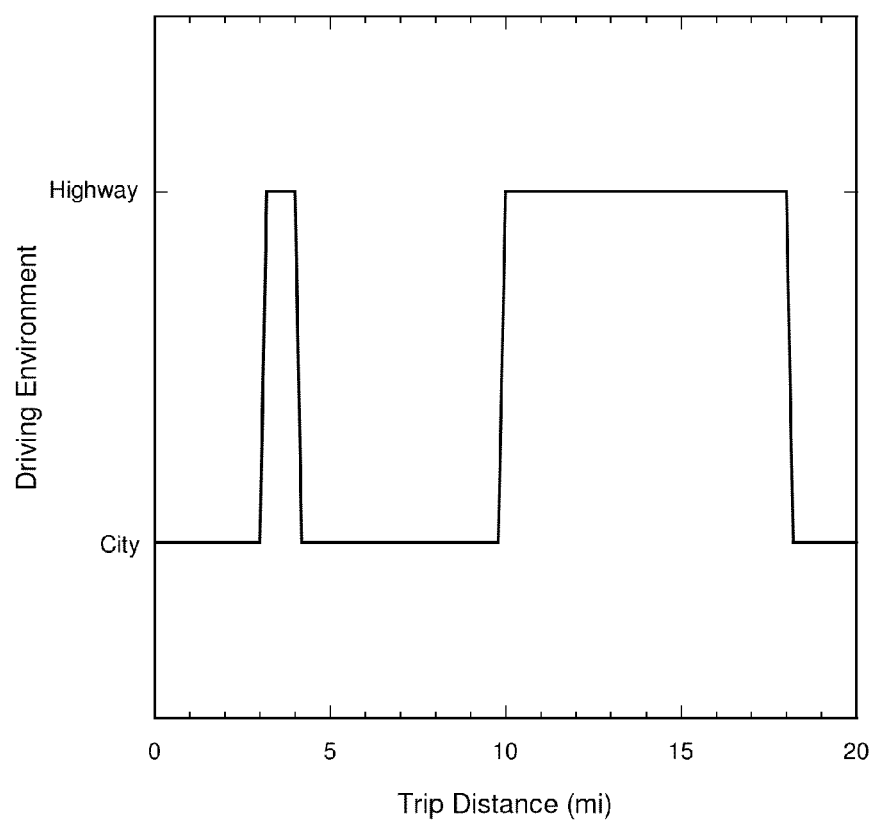
FIG. 14 is a schematic representation of a driving schedule for driving through city and highway environments.

To illustrate how this affects a range analysis calculation we can simulate a 20 mi trip with the simple city/highway schedule of FIG. 14. This schedule consists of alternating city/highway sections that have been designed to match the EPA's overall 55/45 weights. It follows that for the case of AC off, the combined maximum range is 120 mi.

Figure 15:
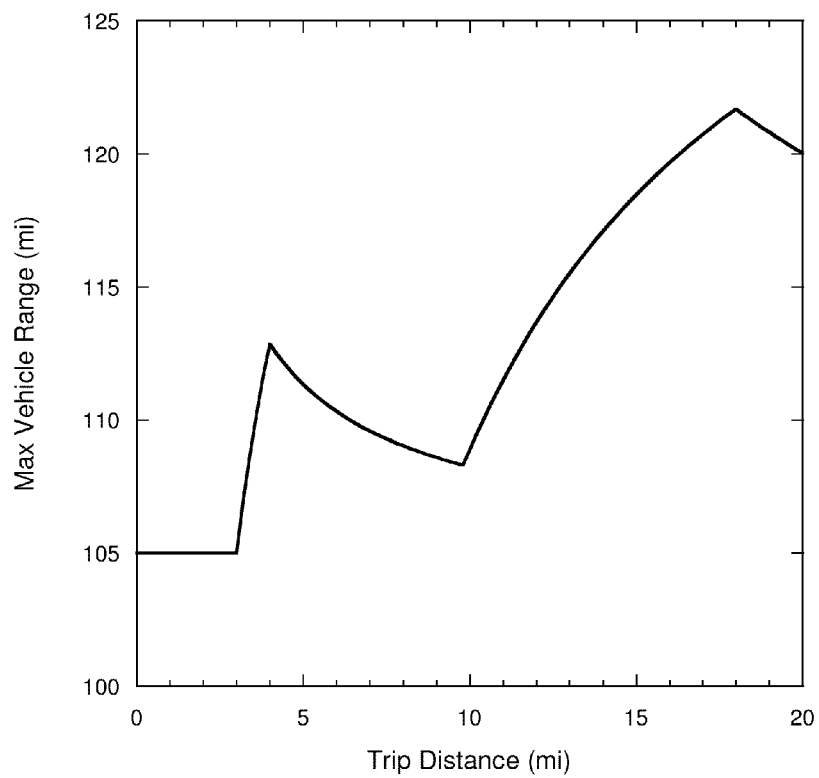
FIG. 15 is a graph of the continuously-averaged maximum range for a trip through city and highway environments.

Application of the present averaging technique results in the maximum range variations illustrated in FIG. 15. Here one can clearly see that the range is below the 120 mi value throughout most of the trip, and it does not approach the combined EPA-like maximum until the end. This can have a significant impact in the range analysis calculation, whose results will be more realistic if we use the continuously averaged maximum range of FIG. 15 instead of the single average range.

Figure 16:
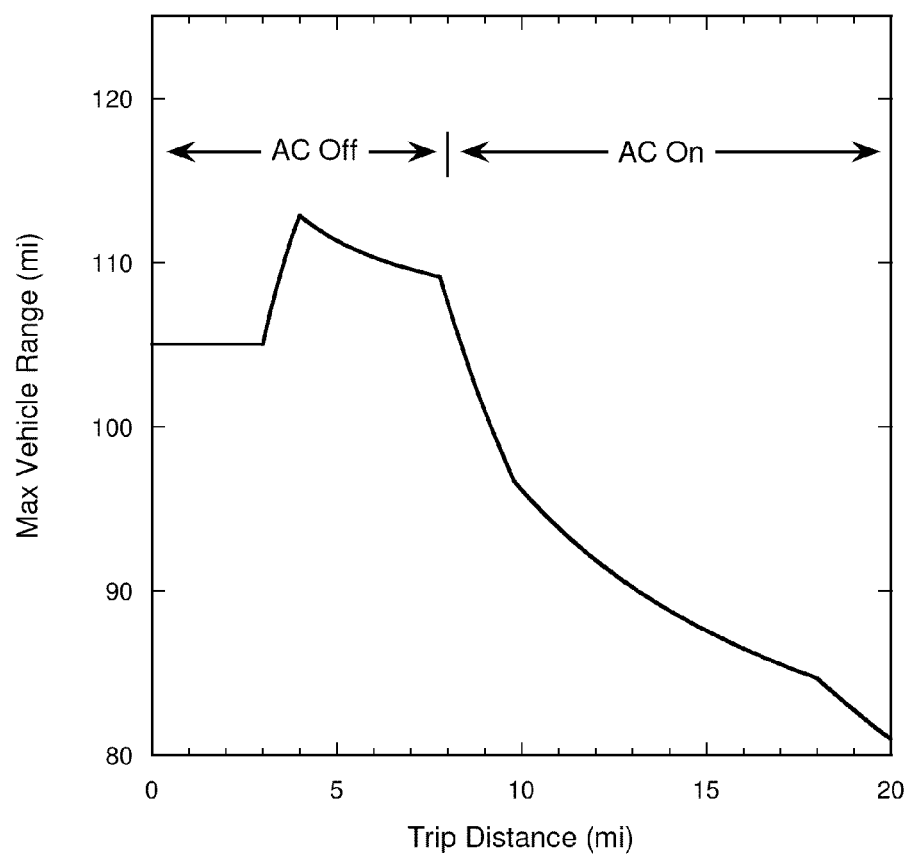

The continuous averaging described here can be applied simultaneously to both the changes in environment and to the on/off state of the AC. Assume that the AC is initially off as we start traversing the driving schedule of FIG. 14. This selects a set of $D_m$ maximum ranges from the table above and the combined average range would resemble that of FIG. 15 as we simulate driving through the schedule. Then, we arbitrarily assume it is turned on after 8 mi into the trip. At this point the user input component 1345 would alert the range analyzer 1346 that the AC is now on, which would result in the selection of a different set of $D_m$ ranges from the table. The averaging continues with the new set of parameters until the simulation reaches the end of the trip. The resulting maximum range values are summarized in FIG. 16. Turning on the AC has a very dramatic impact on maximum range, and subsequently, on the range-analysis results. In this particular case, the driver will be able to immediately see the impact that the AC will have on the range contour or color-coded route and perhaps turn it off if the destination or a fueling/charging station might not be reached.

This averaging will improve the results of the methods in the patent application cited above that was filed on Oct. 12, 2012, by Pablo A. Vicharelli et al. for a METHOD AND SYSTEM FOR VEHICLE RANGE ANALYSIS" which focuses on tractive effects. In addition, it lets us handle the accessories being on/off in a simpler, more accurate way. If we have data like that in the table above, we could now ignore the "H force" term and use accessory on/off ranges $D_m$ directly.

Displaying Range Information

Our approach includes unique ways of displaying range information. FIG. 11 shows some predicted results overlaid on a map 1160 for a vehicle 1176 located in downtown Boulder, Colo. This region was chosen because it contains very rugged terrain to the west of the city, while to the east the terrain is relatively flat with some gentle slopes down in some directions. The black circle 1162 corresponds to the coverage predicted by the current state of the art for a given amount of fuel/charge. The shaded area 1164 corresponds to the locations that can be reached by the vehicle according to the present model after correcting the reference results for road effects and terrain. The reduction in coverage is quite dramatic for this geographical area and clearly displays the effects of some of the terms discussed above. Areas that have few or no roads or the roads go uphill will be penalized by the present model, and that is precisely what can be observed on the western part 1166 of the calculated contour. In cases where the terrain slopes downhill and the roads happen to be aligned along radial directions, as in the case of contour sections 1168 and 1170 we observe enhancements and the coverage actually goes beyond the reference circle. In one instance, contour section 1172 we observe the interplay of terrain and roads. Even though the terrain goes downhill, and an enhancement is expected, there are few roads and they are not aligned with the radials, causing a zig-zag shape that decreases the range in that direction. Finally, near contour section 1174 we observe a deep decrease in range, which is simply a resolution artifact. These sample calculations have been done at very low resolution, using M=16 angles, which means a resolution of 22.5 degrees. In practice, the resolution could be adaptive, by running at a low resolution when a parameter such as the vehicle location changes, to provide instantaneous results and then refine them by running extra radials.

Figure 17:
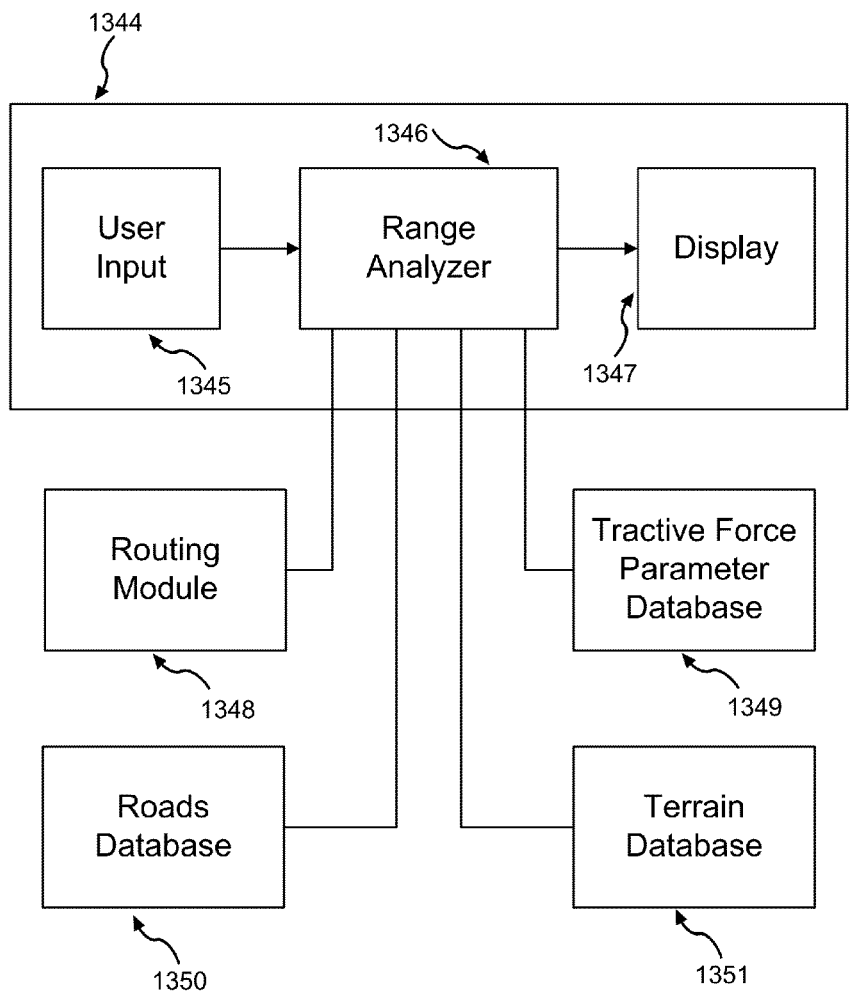
FIG. 17 is an illustration of a representative apparatus.

FIG. 17 generally illustrates a computerized range analysis apparatus 1344 capable of performing the required operations. It may consist of a portable or in-dash vehicle navigation device, it may consist of a smart-phone device, or it may consist of any type of computer system that interprets and executes software instructions. The apparatus does not need to be installed in the vehicle, but rather, it can be placed in some stationary location and it would interact with the vehicle via wireless access. The main component is the range analyzer 1346, which coordinates the collection of the necessary input data from the appropriate databases and the processing of the instructions provided by the user, to calculate the vehicle's range. The user would enter data into this apparatus with the help of the usual interactive devices 1345, such as a keyboard, a mouse, a touch-sensitive pad or display, etc. In an alternative configuration these devices can be replaced or augmented with a microphone and voice recognition means to enable the user to interact with the range analyzer. The display device 1347 is used to display the results of the range calculations. Alternatively, the display device can be omitted or augmented with another output device such as voice instructions, a printer or hard disk, to which any data normally displayed to an operator can be sent.

The array of waypoints that describe a route are obtained from a routing module 1348, which can be any navigation system that provides detailed driving directions. For the case of a single route the user can enter the destination address or its latitude/longitude coordinates, and the starting point can be either obtained directly from a device that provides location services such as the global positioning system (GPS) or it can be entered manually by the user. Alternatively, the range analyzer module 1346 can access a roads database 1350 and provide the road data to the routing module 1348. The roads database can contain, in addition to the road coordinates, information such as road type (highway, city street, unpaved road, etc.), driving speed information, etc. The tractive force information can be stored in a database 1349 that will contain rolling resistance information for a variety of road types, as well as drag coefficients and frontal area data for vehicles of interest. Finally, the terrain database 1351 contains digital terrain maps that can be used by the range analyzer 1346 to associate a ground elevation with each waypoint and to subsequently evaluate the slope angle of each segment.

Figure 18:
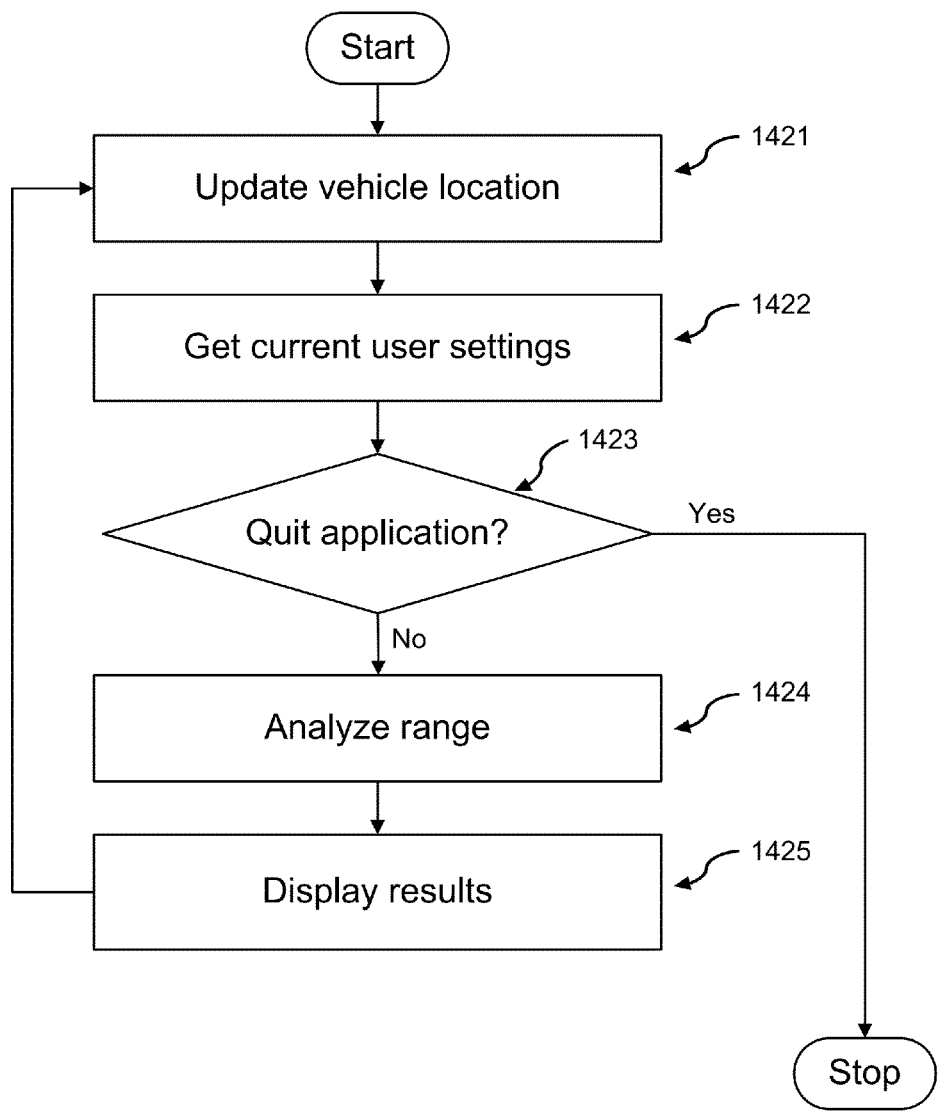
FIG. 18 is a flowchart of the process for analyzing vehicle range in a representative apparatus.

FIG. 18 shows a typical configuration for the range analyzer. It would run continuously, updating the predicted range results as the vehicle moves. The loop starts with an update 1421 of the current location, followed by a refresh 1422 of the current user settings to check if the user now wishes a different kind of analysis or to modify any of the user-supplied data, or perhaps quit the application. It proceeds with the range calculation 1424 followed by the real-time refresh 1425 of the display.

Figure 19:
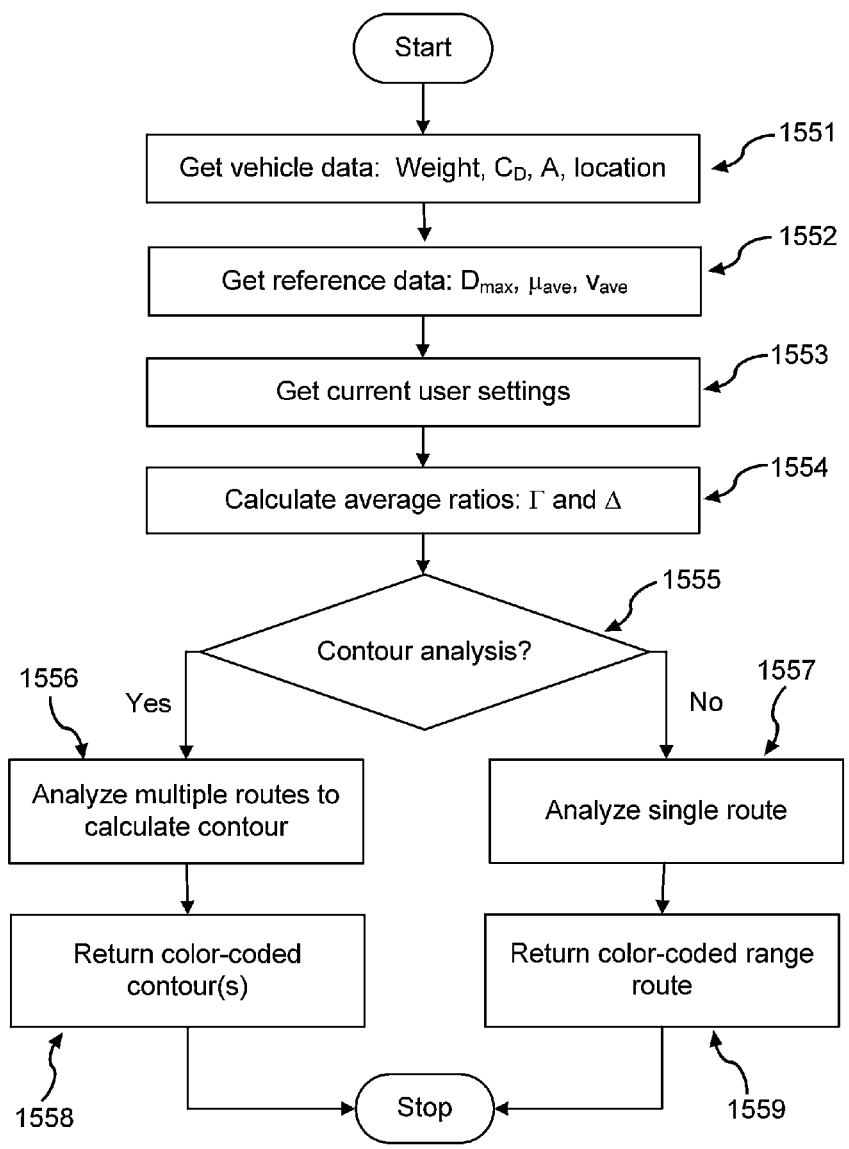
FIG. 19 is a flowchart of the process for calculating range for both single route and contours.

FIG. 19 shows an example of the possible processing that the range analysis 1424 could perform. The first step 1551 would gather the vehicle data. Some parameters such as the weight, drag coefficient, and frontal area need to be obtained only once, but the location would ideally be obtained on a continuous basis. Step 1552 gathers the EPA-like reference parameters while step 1553 collects the current user settings. At this point, we have the necessary information to calculate in step 1554 the average ratios $\Gamma$ and $\Delta$. Based on the user's input, the processing branches 1555 into contour 1556 or single-route 1557 analysis. Details of the contour processing can be found in FIG. 10 while the single-route processing can be found in FIG. 6.

What is claimed is:

1. A method for determining range of a vehicle to follow along a projected route comprising:
   within a computerized apparatus,
      obtaining information concerning an estimated range, $D_{max}$, for the vehicle;
      determining a route to a destination along roads available to be followed by the vehicle;
      dividing the route into a number, N, of road segments;
      for each such road segment, k, being followed by the vehicle,
         determining whether the respective road segment is of a certain type of road segment; and
         adding a factor to a running sum based on both the type of road segment and an energy spent to travel along the road segment, wherein energy spent to travel along each such road segment, k, is taken from $$\sum_{k}^{n \leq N} \alpha_k d_k = D_{max}$$

where $$d_k = s_k \cos(\theta_k)$$

is a projection of the k-th segment $s_k$ on a ground reference; and $$\alpha_k = \frac{1}{(1+\Gamma)(1+\Delta)}\left[\left(\frac{\mu_k}{\mu_{ave}}\right) + \left(\frac{\tan(\theta_k)}{\mu_{ave}}\right) + \Gamma\sec(\theta_k)\left(\frac{v_k}{v_{ave}}\right)^2 + \Delta(1+\Gamma)\sec(\theta_k)\left(\frac{G_k + H_k}{G_{ave} + H_{ave}}\right)\right]$$

is a coefficient that weighs contributions for one or more current conditions that depend on one or more aspects of road slope angle $\theta_k$, rolling resistance $\mu_k$, velocity $v_k$, driver behavior $G_k$, and accessory energy $H_k$ for each road segment, k, relative to one or more aspects of measured values including a ratio of aerodynamic force to rolling resistance force $\Gamma$, and other forces including effective vehicle accessory forces $\Delta$, average rolling resistance $\mu_{ave}$, average velocity $v_{ave}$, average driver behavior $G_{ave}$, and average accessory energy $H_{ave}$; and adjusting the estimated range based on the running sum, to determine a location along the route where a remaining energy available for the vehicle to follow the route will reach a predetermined level; and on a display device located in the vehicle,
   displaying a representation of result of adjusting the estimated range.

2. The method of claim 1 wherein adjusting the estimated range further comprises continuously adjusting the range according to environmental conditions.

3. The method of claim 2 wherein the environment conditions comprise determining whether the vehicle has actually followed a particular road segment of a particular type along the route.

4. The method of claim 1 wherein adjusting the estimated range additionally comprises: continuously averaging the estimated range to account for an operating state of a vehicle accessory.

5. The method of claim 1 wherein a different estimated range is used depending upon an operating state of a vehicle accessory.

6. The method of claim 1 wherein the information concerning the type of road segment is taken from a stored map.

7. The method of claim 1 wherein the estimated range is derived from a fixed expected ratio of road types that include highway and city.

8. The method of claim 1 wherein the estimated range is further adjusted based on the type of road segment from $$D_{comb}(k) = \sum_{m=1}^{M} a_m(k) D_m, k \leq N$$

where $D_m$ is the maximum range associated with an environment type, m, for road segment k, with m being taken from at least city or highway, and $D_{comb}(k)$ is a resulting combined maximum range evaluated dynamically up to segment k as the vehicle travels, and where $$a_m(k) = \frac{1}{k}\sum_{j=1}^{k} \delta_{e(j),m}$$

with $$\delta_{e(j),m} = \begin{cases} 1, & \text{if } e(j) = m \\ 0, & \text{otherwise} \end{cases}$$

with e(j) being an environment identifier for the j-th segment, with e(j)={1, 2, ..., M}, δ is a Kronecker delta, and $a_m(k)$ is at least a city or highway cumulative weight for the m-th environment for a trip that has gone to the k-th segment.

* * * * *